A. HEINZ.
Water-Filters.

No. 146,590. Patented Jan. 20, 1874.

WITNESSES.
J. H. Parsons
C. N. Woodward

Adam Heinz.
INVENTOR By,
Burke, Fraser & Co
attys.

UNITED STATES PATENT OFFICE.

ADAM HEINZ, OF BUFFALO, NEW YORK.

IMPROVEMENT IN WATER-FILTERS.

Specification forming part of Letters Patent No. 146,590, dated January 20, 1874; application filed December 2, 1873.

*To all whom it may concern:*

Be it known that I, ADAM HEINZ, of Buffalo, in the county of Erie and State of New York, have invented certain Improvements in Water-Filters, of which the following is a specification:

This invention relates to combined water coolers and filters; and consists in arranging, in the bottom of the water-reservoir, an annular charcoal-receptacle, with outside induction-openings, through which the water is sweetened as it passes through, and exits, by other openings, into a circular space having a water-tight cover, and leading to the usual filtering-chamber, as hereinafter specified.

Figure 1:
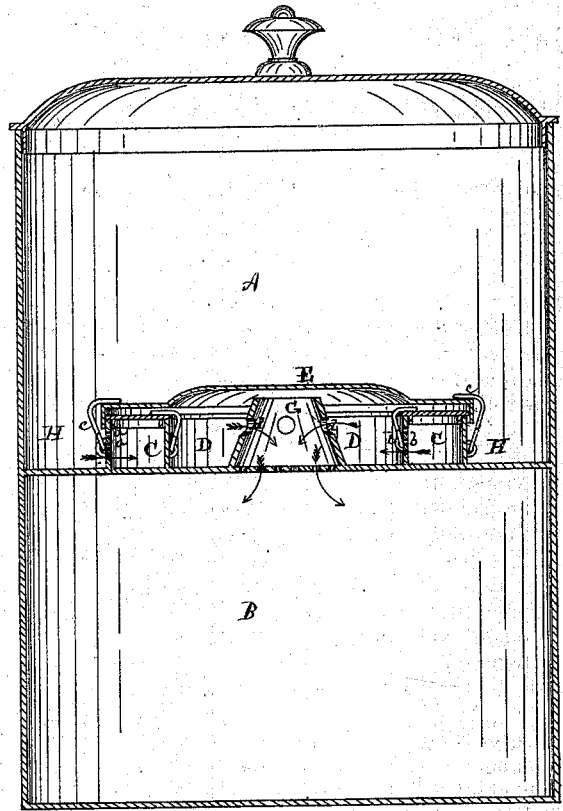
Figure 2:
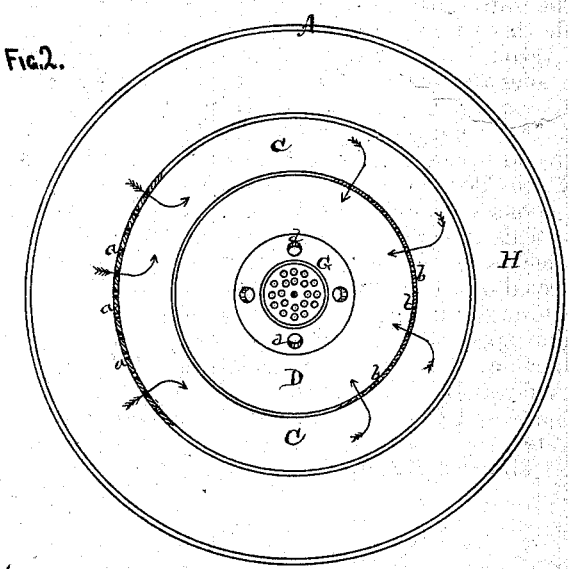

In the drawings, Figure 1 is a vertical section through the center; Fig. 2, a plan.

A represents the water-receptacle, and B the filtering-department beneath. C is an annular hollow ring filled with charcoal, and fastened, in the center, to the bottom of the water-receptacle A. It is permanently closed at the top, but has induction openings or perforations $a$ $a$, which admit the water into the sweetening-department inside this ring C, where it slowly works its way through the charcoal, and exits, by eduction holes or perforations $b$ $b$, into a central circular space, D. To keep the water in the receptacle A from getting into the circular space D, except by passing through the charcoal ring C, I provide a water-tight cover, E, fastened by hooks $c$ $c$, and rubber packing, if necessary. This cover is removable when it becomes necessary to clean out the space D of any charcoal or other sediment that may have worked through the ring C. In the center of this circular space D is a hollow conical receptacle, G, in which the usual filtering medium is placed, and which has openings $d$ $d$ at a little distance above the bottom line, through which the water from the central space D flows into the filtering-chamber B.

The holes $d$ are set, as described, so that charcoal, &c., that may escape through openings $b$ $b$ will settle at the bottom, and not pass into these holes. For a similar reason the perforations $a$ $a$ in the periphery of the charcoal ring C are arranged above the bottom, so as to allow the dirt and other impurities of the water, when put into the reservoir A, to settle on the bottom in the circular space H between the walls and the receptacle C, and not get into the charcoal-chamber, where it would be much harder to get it out, besides interfering with a perfect action by the charcoal on the water by clogging.

By my arrangement, the settlings from the water can be easily cleaned out of the space H, and the settlings from the charcoal-chamber can be readily removed from the central space D.

The slow action of the water through the sweetening-department is one of the great advantages I claim for my device.

I claim—

1. The arrangement, inside the water-reservoir A, of the annular charcoal-receptacle C, having outer induction-perforations $a$ $a$ and inner eduction perforations or openings $b$ $b$, as specified.

2. The annular charcoal-receptacle C, arranged within the water-reservoir A, and provided with the outer induction-openings $a$ and inner eduction-openings $b$, in combination with the air and water tight cover E, applied to said annular receptacle C, in the manner and for the purpose herein set forth.

In witness whereof I have hereunto signed my name in the presence of two subscribing witnesses.

ADAM HEINZ.

Witnesses:
J. R. DRAKE,
GEO. J. MUNSCHAUER.